Patented Sept. 25, 1928.

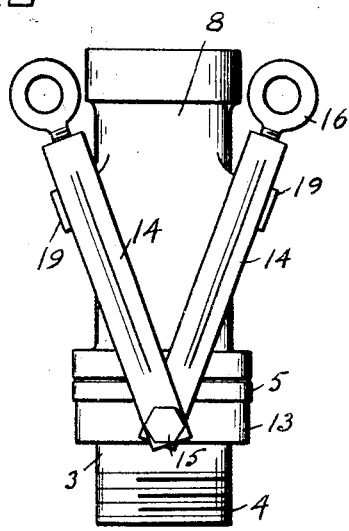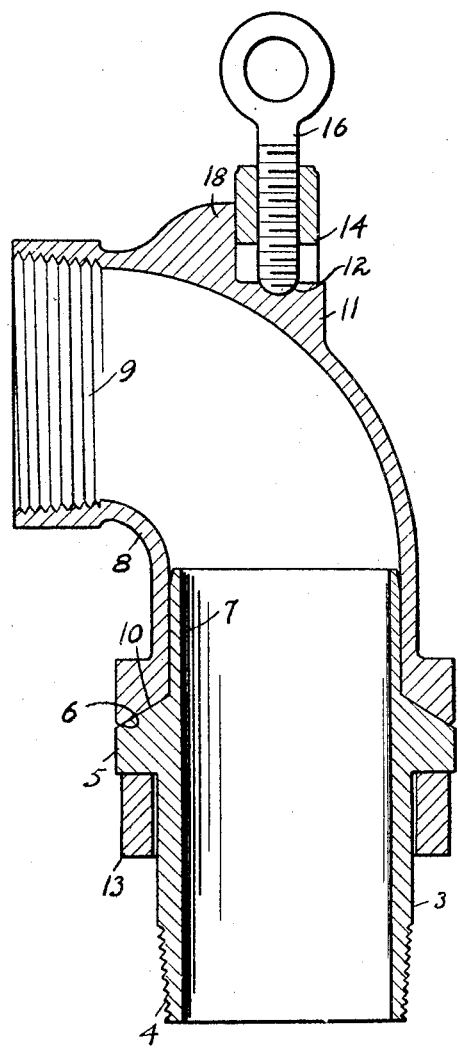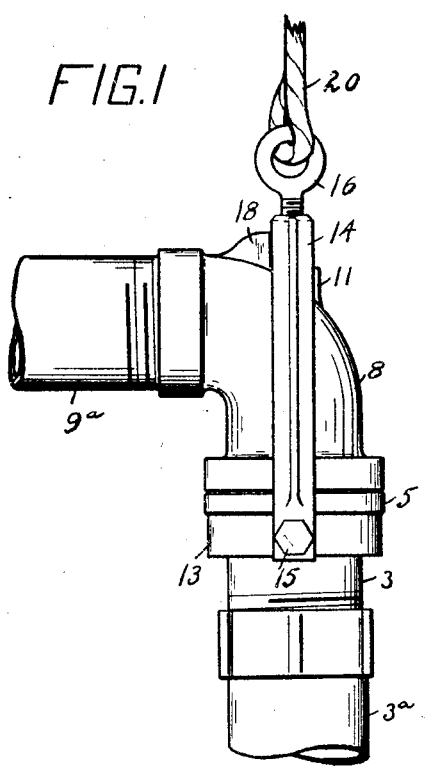

UNITED STATES PATENT OFFICE.

JOHN W. MacCLATCHIE, OF COMPTON, CALIFORNIA.

COUPLING.

Application filed August 31, 1925. Serial No. 53,486.

My invention relates to couplings for pipe or hose, and more particularly to a coupling forming a part of a relatively heavy installation and adapted to connect a hose to a fixed conduit.

The salient objects of the invention are, first, to provide for relative turning of the parts which are to be connected as they are brought into engagement, without necessitating turning of the engaging means; second, to furnish convenient facilities for hoisting a displaceable part of the coupling relative to a fixed part and centering and maintaining the position of the cooperating parts throughout assembly thereof; and third, to couple the parts in a very simple and practical manner requiring but little attention on the part of the operator, and by a device of great strength and relatively small cost.

My objects are attained by the construction illustrated in the accompanying drawings, in which:

Fig. 1 is a side elevation of an angle type coupling embodying the invention.

Fig. 2 is a central section of the angle type coupling.

Fig. 3 is a side elevation showing a method of applying the invention to a straight run coupling.

The part 3 of the coupling is ordinarily connected to a hose 3ª by means of the exteriorly threaded male end 4, and the part 3 is provided with an intermediate flange 5 having a convex spherical or conical seating surface at 6, and a spigot end 7 projecting above said surface.

The cooperating part 8 of the coupling may be either an elbow fitting, as shown in Figs. 1 and 2, or a straight run fitting as shown in Fig. 3. It has an interiorly threaded female end 9 by which it may be connected to a pipe 9ª so as to form a fixed part of the installation, the part 3 with hose 3ª connected thereto, being adapted to be hoisted into coupling engagement with the part 8 which is provided with a concave spherical or conical seating surface 10 at its other extremity. The bore of part 8 is adapted to receive the spigot end 7 of the part 3.

In the type shown in Figs. 1 and 2 the casting forming the part 8 is thickened at 11 and provided with an external concave bolt seat 12 in line with the axis of the end of the bore of part 8 which is adapted to receive the spigot end 7, and perpendicular thereto.

A ring 13 is adapted to slip over the displaceable part 3 of the coupling and engage the under side of flange 5; and a U-shaped yoke 14 has its extremities pivotally connected to the ring, as by cap screws 15. The yoke is tapped at its medial portion and provided with a convex ended eye-bolt 16 adapted for engaging seat 12.

The integral stop lug 18, exteriorly formed on part 8, is provided to assist in the quick positioning of yoke 14 in operation.

One method of applying my invention to straight run couplings is shown in Fig. 3. In this case two yokes are attached to ring 13, and opposite lugs 19 are provided on fitting 8 for seating the eye-bolts in a similar manner to that shown in Fig. 2.

A suitable hoisting medium such as a cable 20 may be connected to the eye of bolt 16, for elevating the part 3 and hose 3ª relative to the member 8 which is a fixed part of the installation. Yoke 14 is turned to bring the same into proper position for swinging over the bolt seat 12, said turning of the yoke being accomplished without necessitating turning of part 3 and consequent twisting of hose 3ª, since the part 3 is free to turn on ring 13. The freedom for relative turning between part 3 and ring 13, also permits turning of hose 3ª when so desired, without turning yoke 14 out of alinement with its seat 12.

As member 3 and hose 3ª are elevated, yoke 14 is swung to one side sufficiently to clear the member 8, while spigot end 7 is held in alinement with the bore of part 8 for relative telescoping of said parts. The arrangement is such that spigot end 7 will start to enter the bore of member 8 when the medial portion of yoke 14 is still an appreciable distance below its seat 12 or 19, and consequently as the elevation of the yoke is continued, the spigot end 7 forms a guide for alining the cooperating parts of the coupling, and when the cooperating seating surfaces 6 and 10 have been brought into proximate relation, the yoke 14 will have been elevated sufficiently for its medial portion to swing over seat 12 and 19. The abutment of bolt 16 against the bolt seat then supports the part 3 and hose 3ª relative to the fixed part 8, so that relatively slight adjustment of the bolt will bring the seating surfaces 6 and 10 into tight engagement and furnish the necessary compression for providing a leak-proof union.

The function of spigot end 7 is not only to assist in positioning the parts during assembly, but to maintain them in proper relation previous to tightening the eye-bolt. In this manner the coupling can be loosely made up and the part 3 turned as desired with reference to part 8, without danger of displacement.

It is to be noted that the weight of ring 13 and its attached yoke is sufficient to keep eye-bolt 16 properly seated when once positioned with the side of yoke 14 against the stop lug 18, so that before tightening the coupling, the part 3 may be turned on ring 13 relative to the fixed member 8, without danger of displacing the ring and yoke.

I claim:

1. In pipe coupling, a fixed conduit having an outwardly flanged end and a substantially uniform bore terminating in a downwardly and outwardly inclined seating surface extending to the outer periphery of the flanged end, a displaceable conduit having a cooperating upwardly and inwardly inclined seating surface and an end projecting an appreciable distance axially beyond said cooperating seating surface at the inner periphery of said cooperating seating surface and adapted to be guided by the inclined seating surface of the fixed conduit for snug telescopic reception of the projecting end of the displaceable conduit in the bore of the fixed conduit so as to engage the cooperating seating surfaces, means for supporting the displaceable conduit permitting turning thereof relative to its supporting means, a yoke pivoted to the supporting means for elevating the displaceable conduit, a seat on the fixed conduit adapted to receive the yoke when the displaceable conduit has been elevated sufficiently to bring the cooperating seating surfaces into proximate relation, the yoke and the projecting end of the displaceable conduit being of a relative length initiating guiding engagement of the projecting end of the displaceable conduit by the inclined seating surface of the fixed conduit an appreciable distance in advance of elevation of the yoke sufficiently to clear and overlie the seat on the fixed conduit, and clamping means on the yoke adapted to engage the seat for drawing the cooperating seating surfaces into tight engagement.

2. In pipe coupling, a fixed conduit having an outwardly flanged end and a substantially uniform bore terminating in a downwardly and outwardly inclined seating surface extending to the outer periphery of the flanged end, a displaceable conduit having a cooperating upwardly and inwardly inclined seating surface and an end projecting an appreciable distance axially beyond said cooperating seating surface at the inner periphery of said cooperating seating surface and adapted to be guided by the inclined seating surface of the fixed conduit for snug telescopic reception of the projecting end of the displaceable conduit in the bore of the fixed conduit so as to engage the cooperating seating surfaces, a yoke engaging the displaceable conduit for elevating the displaceable conduit, a seat on the fixed conduit adapted to receive the yoke when the displaceable conduit has been elevated sufficiently to bring the cooperating seating surfaces into proximate relation, and clamping means between the yoke and seat for drawing the cooperating seating surfaces into tight engagement.

In testimony whereof I have affixed my signature to this specification.

JOHN W. MacCLATCHIE.